US012798417B2

(12) United States Patent
Cole et al.

(10) Patent No.: US 12,798,417 B2
(45) Date of Patent: Nov. 17, 2026

(54) ELECTRICAL VEHICLE SOLAR PANEL CHARGING DEVICE

(71) Applicants: Lakisha Cole, Castro Valley, CA (US); Niya Linton, Castro Valley, CA (US)

(72) Inventors: Lakisha Cole, Castro Valley, CA (US); Niya Linton, Castro Valley, CA (US)

( * ) Notice: Subject to any disclaimer, the term of this patent is extended or adjusted under 35 U.S.C. 154(b) by 544 days.

(21) Appl. No.: 18/390,477

(22) Filed: Dec. 20, 2023

(65) Prior Publication Data

US 2024/0208347 A1 Jun. 27, 2024

Related U.S. Application Data

(60) Provisional application No. 63/434,123, filed on Dec. 21, 2022.

(51) Int. Cl.

| | |
|---|---|
| ***B60L 53/34*** | (2019.01) |
| ***B60L 53/12*** | (2019.01) |
| ***B60L 53/51*** | (2019.01) |
| ***B60L 53/57*** | (2019.01) |
| ***B60R 11/00*** | (2006.01) |
| ***H02S 30/20*** | (2014.01) |
| ***H02S 40/32*** | (2014.01) |

(52) U.S. Cl.

CPC ............... *B60L 53/34* (2019.02); *B60L 53/12* (2019.02); *B60L 53/51* (2019.02); *B60L 53/57* (2019.02); *B60R 11/00* (2013.01); *H02S 30/20* (2014.12); *H02S 40/32* (2014.12); *B60L 2210/10* (2013.01); *B60R 2011/0028* (2013.01); *B60R 2011/0057* (2013.01)

(58) Field of Classification Search

CPC .......... B60L 53/34; B60L 53/12; B60L 53/51; B60L 53/57; B60L 2210/10; B60R 11/00; B60R 2011/0028; B60R 2011/0057; H02S 30/20; H02S 40/32; H02S 10/40; H02S 20/30; Y02T 10/7072

USPC .......................................................... 320/109

See application file for complete search history.

(56) References Cited

U.S. PATENT DOCUMENTS

| | | | |
|---|---|---|---|
| 4,592,436 | A | 6/1986 | Tomei |
| 5,154,481 | A | 10/1992 | Paetz |
| 5,545,261 | A | 8/1996 | Ganz |
| 5,725,062 | A | 3/1998 | Fronek |

(Continued)

*Primary Examiner* — Julian D Huffman
*Assistant Examiner* — Aiman Bickiya
(74) *Attorney, Agent, or Firm* — Brennan, Manna & Diamond, LLC

(57) ABSTRACT

An EV solar panel charging device is disclosed that can either be universal for all EV vehicles or variable depending on style or type of charging port input sockets the EV uses. The EV solar panel charging device comprises a body component that is configured in a rectangular shape positioned on a roof of an electric vehicle. The body component comprises a plurality of hexagonal solar panels and a wireless transmitter installed on top of a flexible heavy-duty magnet. Further, a wireless receiver configured as an EV charging plug, connects to and charges through the charging port of the EV vehicle. Specifically, the wireless receiver will connect straight to the electric vehicle's charging port input sockets, initialized via a built-in power switch. Accordingly, wireless receivers may vary depending on the type of EV being used. Users can activate the supplemental power at any time to maintain power to the vehicle.

19 Claims, 3 Drawing Sheets

(56) References Cited

U.S. PATENT DOCUMENTS

| | | | | |
|---|---|---|---|---|
| 6,586,668 | B2 | 7/2003 | Shugar | |
| 2008/0100258 | A1 | 5/2008 | Ward | |
| 2010/0109445 | A1* | 5/2010 | Kurs | B60L 50/20<br>307/104 |
| 2011/0089887 | A1* | 4/2011 | Ward | B60L 8/003<br>320/101 |

* cited by examiner

ELECTRICAL VEHICLE SOLAR PANEL CHARGING DEVICE

CROSS-REFERENCE TO RELATED APPLICATION

The present application claims priority to, and the benefit of, U.S. Provisional Application No. 63/434,123, which was filed on Dec. 21, 2022, and is incorporated herein by reference in its entirety.

FIELD OF THE INVENTION

The present invention relates generally to the field of electrical vehicle ("EV") solar panel charging devices. More specifically, the present invention relates to a wireless portable hexagonal solar panel charging mat with a wireless transmitter that connects to the roof of the vehicle via a flexible, heavy-duty magnet and a wireless receiver that connects to the charging port of an EV. Accordingly, the present disclosure makes specific reference thereto. Nonetheless, it is to be appreciated that aspects of the present invention are also equally applicable to other like applications, devices and methods of manufacture.

BACKGROUND

By way of background, this invention relates to improvements in EV solar panel charging devices. Generally, electric vehicles are becoming increasingly popular due to their environmental efficiency, allowing users to travel longer distances without the need for fossil fuels. However, despite improvements being made to the vehicle batteries, they still may lose charge quickly and leave people unable to travel more than a couple hundred miles at a time. Further, charging stations may not be readily available at standard gas stations across the country.

Furthermore, while charging is available to some people in their homes/garages, it presents a problem to apartment dwellers and to people who do not have access to a charging system. Remote power stations may be useful to supplement or as an alternative to the home recharging concept. Additionally, solar power does not require the installation of power lines for the supply of power to charging stations. As long as there is sunlight, an EV will have continuous solar power stored to travel longer distance without the need to stop at a charging station. Therefore, preventing the possibility of becoming a target and/or victim of a crime.

Accordingly, there is a demand for an improved EV solar panel charging device that features a wireless portable charging mat that transfers solar power from the solar panels to the vehicle battery via a wireless receiver that connects and sends solar power through a charging port. More particularly, there is a demand for an EV solar panel charging device that connects to the roof of a vehicle to charge the vehicle while it is parked or traveling.

Therefore, there exists a long-felt need in the art for an EV solar panel charging device that provides users with a portable hexagonal solar panel charging mat with a wireless transmitter that connects to the roof of the vehicle via a flexible, heavy-duty magnet. There is also a long-felt need in the art for an EV solar panel charging device that transfers power to a vehicle via a wireless transmitter to a wireless receiver that connects to and charges through the charging port of the electric vehicle. Further, there is a long-felt need in the art for an EV solar panel charging device that features a charging mat that transfers solar power from the panels to the vehicle battery, offering supplemental power while traveling. Moreover, there is a long-felt need in the art for a device that enables people to travel longer distances in their electric vehicles without having to locate a charging station. Further, there is a long-felt need in the art for an EV solar panel charging device that preventing users from being stranded in dangerous or remote areas. Finally, there is a long-felt need in the art for a solar panel charging device that utilizes a switch to activate the backup power of the solar panels.

The subject matter disclosed and claimed herein, in one embodiment thereof, comprises an EV solar panel charging device. The device is a wireless portable electric vehicle charging solar mat that can either be universal for all EV vehicles or variable depending on the style or type of charging port input sockets the EV uses. The EV solar panel charging device comprises a body component that is configured in a rectangular shape that is positioned on a roof of an electric vehicle. The body component comprises a plurality of hexagonal solar panels and a wireless transmitter installed on top of a flexible heavy-duty magnet. Further, a wireless receiver configured as an EV charging plug. Thus, the wireless receiver connects to and charges through the charging port of the EV vehicle. Specifically, the wireless receiver will connect straight to the electric vehicle's charging port input sockets. Accordingly, wireless receivers may be universal or vary depending on the type of EV being used. Once installed, the vehicle will have the ability to absorb solar energy to charge the battery. When the initial battery life runs out, the user may use a switch to activate the backup power of the solar panels. The solar panels are hexagonal and absorb sunlight while the vehicle is parked or traveling. Users can activate the supplemental power at any time to maintain power to the vehicle.

In this manner, the EV solar panel charging device of the present invention accomplishes all of the forgoing objectives and provides users with a device that provides a portable solar panel charging mat for an EV. The device comprises a plurality of hexagonal solar panels and a wireless transmitter to transfer power. The device can be secured to a vehicle via a magnet.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an EV solar panel charging device. The device is a portable electric vehicle charging solar mat that can either be universal for all EV vehicles or variable depending on the style or type of charging port input sockets the EV uses. The EV solar panel charging device comprises a body component that is positioned on a roof of an electric vehicle. The body component comprises a plurality of solar panels and a wireless transmitter installed on top of a magnet. Further, a wireless receiver configured as an EV charging plug connects to and charges through the charging port of the EV vehicle which can be activated by an easy on/off switch built within the wireless receiver. Specifically, the wireless receiver will connect straight to the electric vehicle's charging port input sockets. Once installed, the vehicle will have the ability to absorb solar energy to charge the battery.

In one embodiment, the EV solar panel charging device is a portable solar charging system for an electric vehicle which comprises a plurality of solar panels typically secured to a vehicle's roof to convert solar energy from the sun into electrical energy and then sends the electrical energy to a battery in the electric vehicle. The electricity collected via the solar panels may be stored in a central battery of the EV. Besides powering the electric vehicle, in some embodiments, electronic equipment within the electric vehicle that is electrically connected to the battery, can also receive supplemental power from the solar panels.

In one embodiment, the EV solar panel charging device comprises a body component that is configured in a rectangular shape and that is positioned on a roof of an electric vehicle. The body component can be any suitable size and shape as is known in the art, as long as the body component can be positioned on an EV's roof without impeding the driver and passengers and without the body component overhanging the roof, causing people walking by the vehicle to make contact with the body component. In one embodiment, the body component is approximately 5' wide×5' long or 3' wide×5' long. In another embodiment, multiple body components can be secured together and positioned on the EV's roof, for use. Any suitable number of body components can be utilized as is known in the art, as long as the body components are in communication with each other to transfer electrical energy, as needed.

In one embodiment, the body component comprises a plurality of solar panels. The plurality of solar panels are typically hexagonal solar panels, and are positioned in series, to harness the solar energy from the sun. In one embodiment, the plurality of solar panels also comprise a 12 VDC-24 VDC converter/regulator and a charge level indicator. Any suitable number and size of solar panels can be utilized on the body component, as long as the solar panels do not hang over the EV's roof and/or impede the driver.

In one embodiment, the body component comprises a wireless transmitter. The wireless transmitter can be any suitable wireless transmitter as is known in the art, as long as the wireless transmitter is in communication with the plurality of solar panels and the wireless receiver to collect electrical energy from the solar panels and transfer the electrical energy to the wireless receiver for use in powering the EV. The wireless transmitter is a standard wireless transmitter as is known in the art and comprises a battery and an antenna to transmit energy, and any other suitable components and connectors as is known in the art to allow the wireless transmitter to function.

In one embodiment, the body component with the plurality of solar panels and the wireless transmitter are positioned on a roof of an EV and secured. Typically, the body component is installed on top of a flexible, heavy-duty magnet, which is then secured to the roof of the EV. However, any other suitable means for securing the body component can be utilized, as is known in the art. In one embodiment, the body component can be permanently secured to the EV roof via screws, bolts, adhesive, etc. In another embodiment, the body component can be removable from the EV roof and can be removably secured to the roof via magnets, brackets, etc.

In one embodiment, the EV solar panel charging device comprises a wireless receiver. The wireless receiver can be any suitable wireless receiver as is known in the art, as long as the wireless receiver has an on/off switch to activate communications with the wireless transmitter. The wireless receiver receives electrical energy from the wireless transmitter. Specifically, collected electrical energy from the solar panels is transferred to the wireless receiver via the wireless transmitter. Typically, the wireless receiver is sized and shaped to resemble an EV charging plug and can be adapted in size and shape for various EV vehicles (i.e., different make and models of EVs). The wireless receiver comprises a battery and an antenna to receive energy, and any other suitable components and connectors as is known in the art to allow the wireless receiver to function. Further, the wireless receiver is implemented within the EV charging plug, such that the EV charging plug and wireless receiver connect to the charging port of the vehicle, for use.

The EV charging plug is a standard charging plug for an EV as is known in the art and comprises standard connectors and receptacles, as well as multiple pins and ports for Level 1 and 2 charging, as well as for positive and negative DC current. In one embodiment, the wireless receiver comprises an emergency release button for quickly removing the wireless receiver charging plug from the EV wireless receiver comprises an on/off switch to initialize the solar energy from the transmitter to the EV battery. Further, the wireless receiver and charging plug comprises a hand grip for easily and efficiently securing the wireless receiver to the EV and removing the wireless receiver, as needed. The hand grip can have textured areas for no-slip gripping and be built-in to the charging plug. Typically, the wireless receiver is incorporated into the EV charging plug, but in other embodiments, the three components can be separate components and secured together for use or used as separate components.

Generally, EV charging comes in three levels: Level 1, Level 2, and Level 3 (also known as DC fast charging). These three levels denote the energy output of a charging device and determine how fast an EV will charge. The amount of electrical energy trapped by the solar panels determines the level of charge produced by the solar panel charging device of the present invention.

In operation, the plurality of solar panels trap energy from the sun and convert it to electrical energy. This electrical energy is then sent via a wireless transmitter to a wireless receiver secured to the EV, and then to the EV's central battery. Accordingly, the central battery can be charged while the EV is driven or parked. The EV solar panel charging device may be available in a variety of shapes and sizes depending on the make and model of the EV. Once installed, the vehicle will have the ability to absorb solar energy to charge the battery. Further, when the initial battery life runs out, the user may use a switch to activate the backup power of the solar panels. Users can activate the supplemental power at any time to maintain power to the electric vehicle with the built-in on/off switch located on the wireless receiver.

In one embodiment, each of the solar panels includes at least one solar cell, a first substrate, a first encapsulant, a second substrate, and a second encapsulant. The solar panel can have a structure in which the second substrate, a solar cell, and the first substrate are sequentially stacked from below, and the first encapsulant and the second encapsulant are components for protecting and adhering the solar cell.

In one embodiment, the solar panel can have at least one solar cell. For example, one or a plurality of solar cells can be provided depending on the design of the solar panel. When a plurality of solar cells are provided, each of the solar cells can be disposed to be spaced apart from each other and can be connected to each other in series to form a string.

In one embodiment, the first substrate is positioned on the first surface of the solar cell. When the solar panel is applied to a car, the first substrate forms an appearance of the car and is visually exposed to the outside of the car. The first substrate forms an outermost layer of the solar panel and is configured to protect the solar cell. The first substrate can be formed of a waterproof transparent material which does not block light incident to the solar cell. For example, the first substrate can be formed of at least one of glass, polycarbonate, and a transparent sheet, etc. The second substrate is positioned on the second surface of the solar cell. When the solar panel is applied to a roof of the EV, the second substrate corresponds to the magnet applied to a roof panel of the EV.

In one embodiment, the body component comprises hinges or flexible connectors between the solar panels, to allow the body component to be folded and stored when not in use. Hinges or flexible connectors may be flexible material connectors such as cloth or plastic that extends between solar panels or any suitable mechanical hinges can be utilizes, as is known in the art.

In yet another embodiment, the solar panel charging device comprises a plurality of indicia.

In yet another embodiment, a method of charging an electric vehicle via solar panels is disclosed. The method includes the steps of providing an EV solar panel charging device comprising a body component with a plurality of solar panels, a wireless transmitter, and a wireless receiver configured as an EV charging plug. The method also comprises inserting the wireless receiver into the EV charging port. Further, the method comprises securing the body component to the roof of an EV via a lightweight, flexible heavy-duty magnet. The method also comprises absorbing sunlight via the solar panels. The method comprises converting the sunlight into electrical energy. Finally, the method comprises transmitting the electrical energy to the EV via the wireless transmitter to the wireless receiver.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
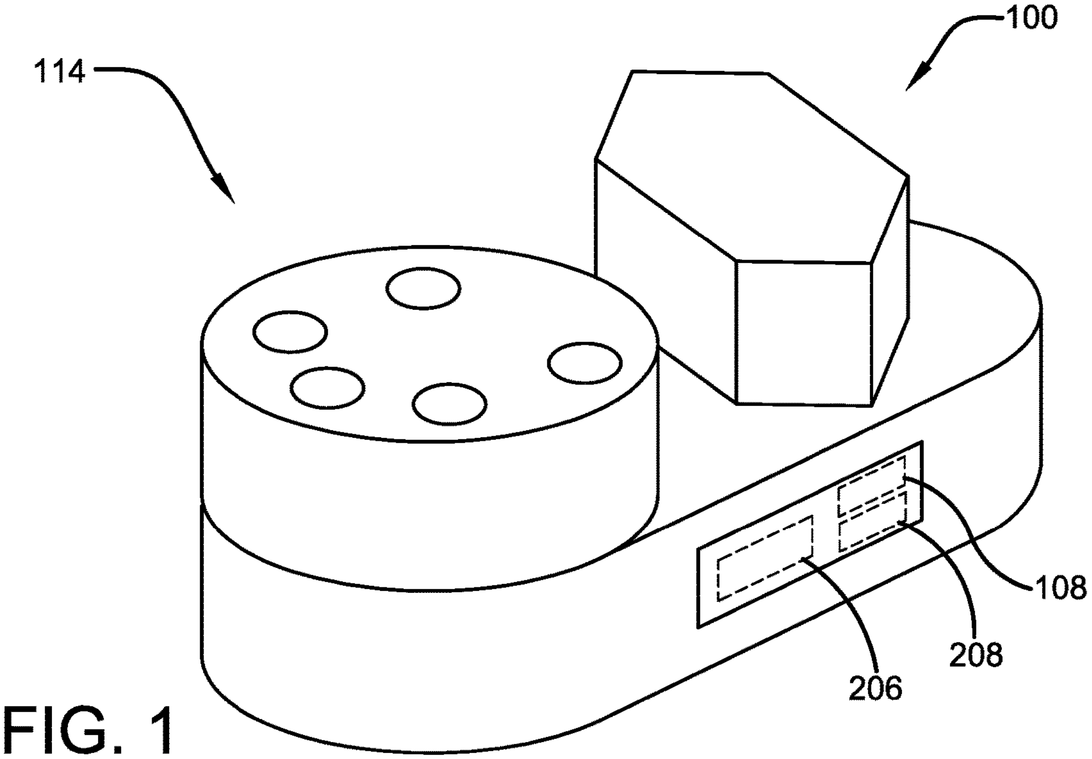
FIG. 1 illustrates a perspective view of one embodiment of the solar panel charging device of the present invention showing the wireless receiver with electrical charging connectors in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an EV solar panel charging device that provides users with a portable hexagonal solar panel charging mat with a wireless transmitter that connects to the roof of the vehicle via a flexible, heavy-duty magnet. There is also a long-felt need in the art for an EV solar panel charging device that transfers power to a vehicle via a wireless transmitter to a wireless receiver that connects to and charges through the charging port of the electric vehicle. Further, there is a long-felt need in the art for an EV solar panel charging device that features a charging mat that transfers solar power from the panels to the vehicle battery, offering supplemental power while traveling. Moreover, there is a long-felt need in the art for a device that enables people to travel longer distances in their electric vehicles without having to locate a charging station. Further, there is a long-felt need in the art for an EV solar panel charging device that preventing users from being stranded in dangerous or remote areas. Finally, there is a long-felt need in the art for an EV solar panel charging device that utilizes a switch to activate the backup power of the solar panels.

The present invention, in one exemplary embodiment, is a novel EV solar panel charging device. The device is a portable electric vehicle charging solar mat that can either be universal for all EV vehicles or variable depending on the style or type of charging port input sockets the EV uses. The EV solar panel charging device comprises a body component that is configured in a rectangular shape that is positioned on a roof of an electric vehicle. The body component comprises a plurality of hexagonal solar panels and a wireless transmitter installed on top of a flexible heavy-duty magnet. Further, a wireless receiver configured as an EV charging plug with a built-in on/off switch that connects to and charges through the charging port of the EV vehicle. Specifically, the wireless receiver will connect straight to the electric vehicle's charging port input sockets and initiated by switch. The present invention also includes a novel method of charging an electric vehicle via solar panels. The method includes the steps of providing an EV solar panel charging device comprising a body component with a plurality of solar panels, a wireless transmitter, and a wireless receiver configured as an EV charging plug with an on/off switch. The method also comprises inserting the wireless receiver into the EV charging port. Further, the method comprises securing the body component to the roof of an EV via a flexible heavy-duty magnet. The method also comprises absorbing sunlight via the solar panels. The method comprises converting the sunlight into electrical energy. Finally, the method comprises transmitting the electrical energy to the EV via the wireless transmitter to the wireless receiver.

Referring initially to the drawings, FIG. 1 illustrates a perspective view of one embodiment of the EV solar panel charging device 100 of the present invention. In the present embodiment, the EV solar panel charging device 100 is an improved EV solar panel charging device 100 that provides a user with a portable electric vehicle charging solar unit. Specifically, the EV solar panel charging device 100 comprises a body component 102 with a plurality of solar panels 104 and a wireless transmitter 106 that is positioned on a roof 110 of an electric vehicle 112. Further, a wireless receiver 108 configured as an EV charging plug 114 connects to and charges through the charging port 116 of the EV vehicle 112. Specifically, the wireless receiver 108 will connect straight to the electric vehicle's charging port 116 input sockets. Once installed, the vehicle 112 will have the ability to absorb solar energy to charge the central battery via power switch located on a wireless receiver (not shown).

Generally, the EV solar panel charging device 100 is a portable solar charging system for an electric vehicle 112 which comprises a plurality of solar panels 104 typically secured to a vehicle's roof 110 to convert solar energy from the sun 118 into electrical energy and then sends the electrical energy to a battery in the electric vehicle (EV) 112. The electricity collected via the solar panels 104 may be stored in a central battery of the EV 112. Besides powering the electric vehicle 112, in some embodiments, electronic equipment within the electric vehicle 112 that is electrically connected to the battery, can also receive supplemental power from the solar panels 104. Additionally, the device 100 can either be designed to be universal for all EV vehicles 112 or variable depending on the style or type of charging port 116 input sockets the EV 112 uses and/or the make and model of the EV 112.

Figure 2:
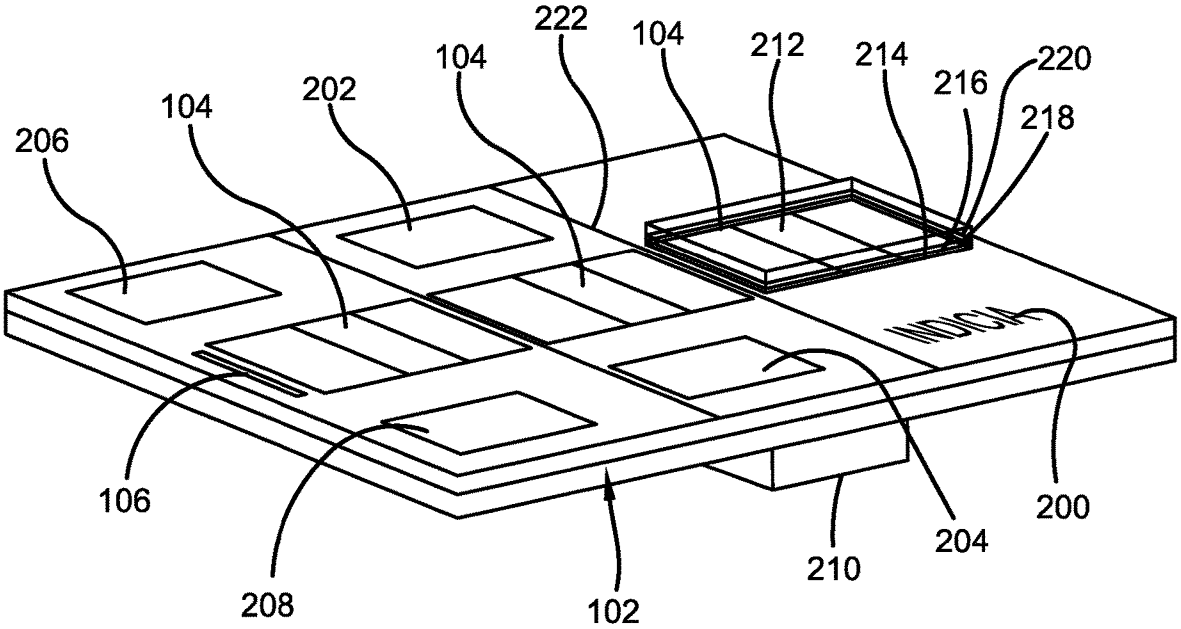
FIG. 2 illustrates a perspective view of one embodiment of the solar panel charging device of the present invention showing the solar panel configuration with the wireless transmitter in accordance with the disclosed architecture.

As shown in FIG. 2, the EV solar panel charging device 100 comprises a body component 102 that is configured in a rectangular shape and that is positioned on a roof 110 of an electric vehicle 112. The body component 102 can be any suitable size and shape as is known in the art, as long as the body component 102 can be positioned on an EV's roof 110 without impeding the driver and passengers and without the body component 102 overhanging the roof 110, causing people walking by the vehicle 112 to make inadvertent contact with the body component 102. In one embodiment, the body component 102 is approximately 5' wide×5' long;

in another embodiment, the body component 102 is approximately 3' wide×5' long. The shape and size of the body component 102 can depend on the make and model of the EV 112 and the needs and/or wants of a user. Furthermore, in another embodiment, multiple body components 102 can be secured together via pins, connectors, etc., and positioned on the EV's roof 110, for use. Any suitable number of body components 102 can be utilized as is known in the art, as long as the body components 102 are in communication (i.e., via wires and connectors), with each other to transfer electrical energy, as needed.

Furthermore, the body component 102 comprises a plurality of solar panels 104. The plurality of solar panels 104 are typically hexagonal solar panels, and are positioned in series, to harness the solar energy from the sun 118, but can be any suitable solar panels 104 as is known in the art. In one embodiment, the plurality of solar panels 104 also comprise a 12 VDC-24 VDC converter/regulator 202 and a charge level indicator 204, and any other suitable components as is needed to be fully operational. Any suitable number and size of solar panels 104 can be secured on the body component 102, as long as the solar panels 104 do not hang over the EV's roof 110 and/or impede the driver.

Additionally, the body component 102 comprises a wireless transmitter 106. The wireless transmitter 106 can be any suitable wireless transmitter 106 as is known in the art, as long as the wireless transmitter 106 is in communication with the plurality of solar panels 104 and the wireless receiver 108 to collect electrical energy from the solar panels 104 and transfer the electrical energy to the wireless receiver 108 for use in powering the EV 112. The wireless transmitter 106 is a standard wireless transmitter 106 as is known in the art and comprises a battery 206 and an antenna 208 to transmit energy, and any other suitable components and connectors as is known in the art to allow the wireless transmitter 106 to function.

Generally, the body component 102 with the plurality of solar panels 104 and the wireless transmitter 106 are positioned on a roof 110 of an EV 112 and secured. Typically, the body component 102 is installed on top of a flexible, heavy-duty magnet 210, which is then secured to the roof 110 of the EV 112. However, any other suitable means for securing the body component 102 can be utilized, as is known in the art. In one embodiment, the body component 102 can be permanently secured to the EV roof 110 via screws, bolts, adhesive, etc. In another embodiment, the body component 102 can be removable from the EV roof 110 and can be removably secured to the roof 110 via magnets 210, brackets, etc., depending on the wants and/or needs of a user.

In one embodiment, each of the solar panels 104 includes at least one solar cell 212, a first substrate 214, a first encapsulant 216, a second substrate 218, and a second encapsulant 220. The solar panel 104 can have a structure in which the second substrate 218, a solar cell 212, and the first substrate 214 are sequentially stacked from below, and the first encapsulant 216 and the second encapsulant 220 are components for protecting and adhering the solar cell 212.

In another embodiment, the solar panel 104 can have at least one solar cell 212. For example, one or a plurality of solar cells 212 can be provided depending on the design of the solar panel 104. When a plurality of solar cells 212 are provided, each of the solar cells 212 can be disposed to be spaced apart from each other and can be connected to each other in series to form a string.

Furthermore, the first substrate 214 is positioned on the first surface of the solar cell 212. When the solar panel 104 is applied to a car 112, the first substrate 214 forms an appearance of the car 112 and is visually exposed to the outside of the car 112. The first substrate 214 forms an outermost layer of the solar panel 104 and is configured to protect the solar cell 212. The first substrate 214 can be formed of a waterproof transparent material which does not block light incident to the solar cell 212. For example, the first substrate 214 can be formed of at least one of glass, polycarbonate, and a transparent sheet, etc. The second substrate 218 is positioned on the second surface of the solar cell 212. When the solar panel 104 is applied to a roof 110 of the EV 112, the second substrate 218 corresponds to the magnet 210 applied to a roof panel 110 of the EV 112.

In one embodiment, the body component 102 comprises hinges or flexible connectors 222 between the solar panels 104, to allow the body component 102 to be folded and stored when not in use. Hinges or flexible connectors 222 may be flexible material connectors such as cloth or plastic that extends between solar panels 104 or any suitable mechanical hinges can be utilized, as is known in the art.

In yet another embodiment, the EV solar panel charging device 100 comprises a plurality of indicia 200. The body component 102 of the device 100 may include advertising, a trademark, or other letters, designs, or characters, printed, painted, stamped, or integrated into the body component 102, or any other indicia 200 as is known in the art. Specifically, any suitable indicia 200 as is known in the art can be included, such as but not limited to, patterns, logos, emblems, images, symbols, designs, letters, words, characters, animals, advertisements, brands, etc., that may or may not be electric vehicle, solar panel, or brand related.

Figure 3:
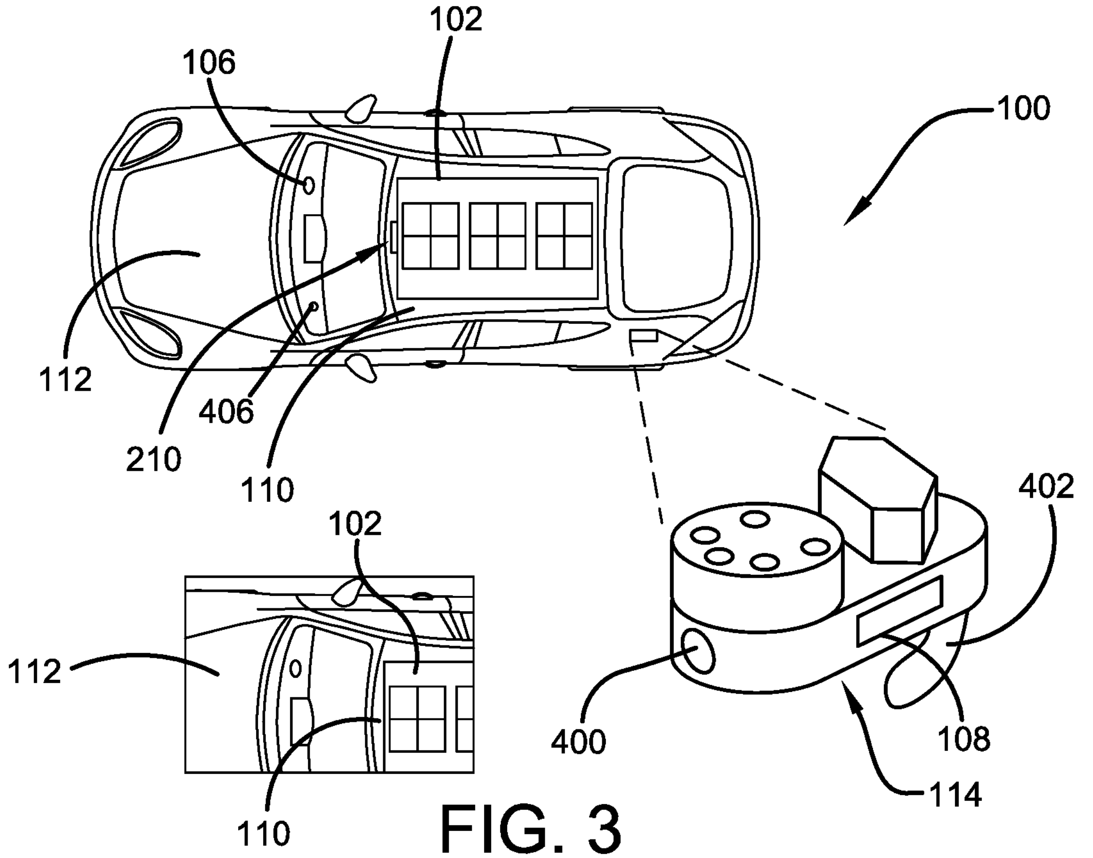
FIG. 3 illustrates a perspective view of one embodiment of the solar panel charging device of the present invention showing the device applied to a vehicle in accordance with the disclosed architecture.
Figure 4:
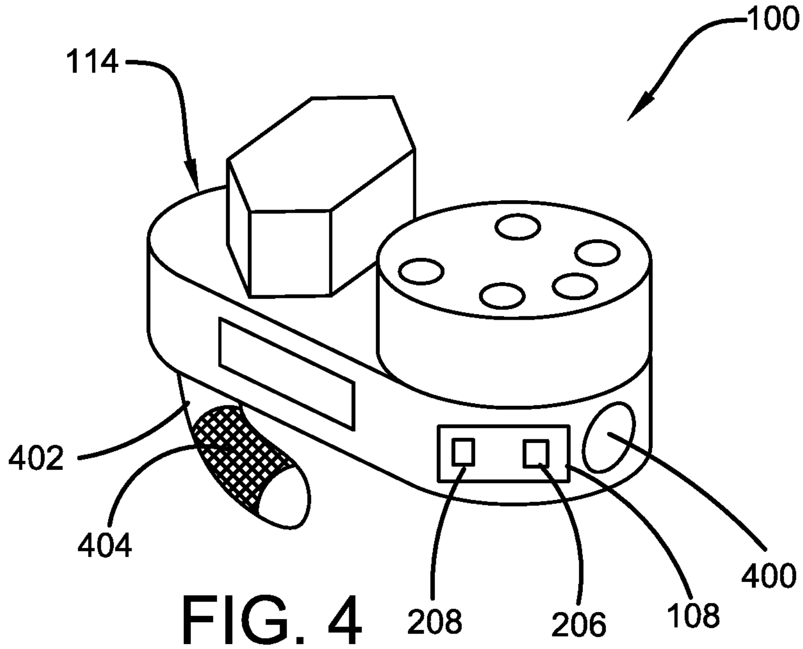
FIG. 4 illustrates a perspective view of one embodiment of the EV solar panel charging device of the present invention showing the wireless receiver in accordance with the disclosed architecture.

As shown in FIGS. 3-4, the EV solar panel charging device 100 comprises a wireless receiver 108. The wireless receiver 108 can be any suitable wireless receiver 108 as is known in the art, as long as the wireless receiver 108 is in communication with the wireless transmitter 106. For purposes of this document, a connection may be a direct connection or an indirect connection (i.e., via intervening elements). Two devices are "in communication" if they are directly or indirectly connected so that they can communicate electronic signals between them.

Further, the wireless receiver 108 receives electrical energy from the wireless transmitter 106. Specifically, collected electrical energy from the solar panels 104 is transferred to the wireless receiver 108 via the wireless transmitter 106. Typically, the wireless receiver 108 is sized and shaped to resemble an EV charging plug 114 and can be adapted in size and shape for various EV vehicles 112 (i.e., different make and models of EVs). The wireless receiver 108 comprises a battery 206 and an antenna 208 to receive energy, and any other suitable components and connectors as is known in the art to allow the wireless receiver 108 to function. Further, the wireless receiver 108 is implemented within the EV charging plug 114, such that the EV charging plug 114 and wireless receiver 108 connect to the charging port 116 of the vehicle 112, for use.

The EV charging plug 114 is a standard charging plug for an EV 112 as is known in the art and comprises standard connectors and receptacles, as well as multiple pins and ports for Level 1 and 2 charging, as well as for positive and negative DC current. In one embodiment, the wireless receiver 108 comprises an emergency release button 400 for quickly removing the wireless receiver 108, charging plug 114 from the EV 112, and a built-in power switch (not shown). Further, the wireless receiver 108 and charging plug 114 comprises a hand grip 402 for easily and efficiently securing the wireless receiver 108 to the EV 112 and removing the wireless receiver 108, as needed. The hand grip 402 can have textured areas 404 for no-slip gripping and be built-in to the charging plug 114. Typically, the wireless receiver 108 is incorporated into the EV charging plug 114, but in other embodiments, the two components 108 and 114 can be separate components and secured together for use or used as separate components 108 and 114.

Generally, EV charging comes in three levels: Level 1, Level 2, and Level 3 (also three levels known as DC fast charging). These three levels denote the energy output of a charging device and determine how fast an EV 112 will charge. The amount of electrical energy trapped by the solar panels 104 determines the level of charge produced by the EV solar panel charging device 100 of the present invention.

In operation, the plurality of solar panels 104 trap energy from the sun 118 and convert it to electrical energy. This electrical energy is then sent via a wireless transmitter 106 to a wireless receiver 108 secured to the EV charging plug 114, and then to the EV's central battery (not shown). Accordingly, the central battery can be charged while the EV 112 is driven or parked. The EV solar panel charging device 100 may be available in a variety of shapes and sizes depending on the make and model of the EV 112. Once installed, the vehicle 112 will have the ability to absorb solar energy to charge the battery. Further, when the initial battery life runs out, the user may use a switch 406 (or other activation means) to activate the backup power of the solar panels 104. Users can activate the supplemental power built into the wireless receiver at any time to maintain power to the electric vehicle 112.

Furthermore, the battery 206 (within the wireless transmitter 106 and/or the wireless receiver 108) may be a disposable battery or a rechargeable battery in the form of an alkaline, nickel-cadmium, nickel-metal hydride battery, etc., such as any 3V-12 volts DC battery or other conventional battery, such as A, AA, AAA, etc., that supplies power to the wireless transmitter 106 and/or the wireless receiver 108. Throughout this specification, the term "battery" may be used interchangeably to refer to one or more wet or dry cells or batteries of cells in which chemical energy is converted into electricity and used as a source of DC power. References to recharging or replacing the battery 206 may refer to recharging or replacing individual cells, individual batteries of cells, or a package of multiple battery cells as is appropriate for any given battery technology that may be used. In addition, a rechargeable embodiment of the battery 206 may be recharged using a USB port (not shown), wherein the USB port is a USB-A, USB-B, Micro-B, Micro-USB, Mini-USB, or USB-C port, etc.

Figure 5:
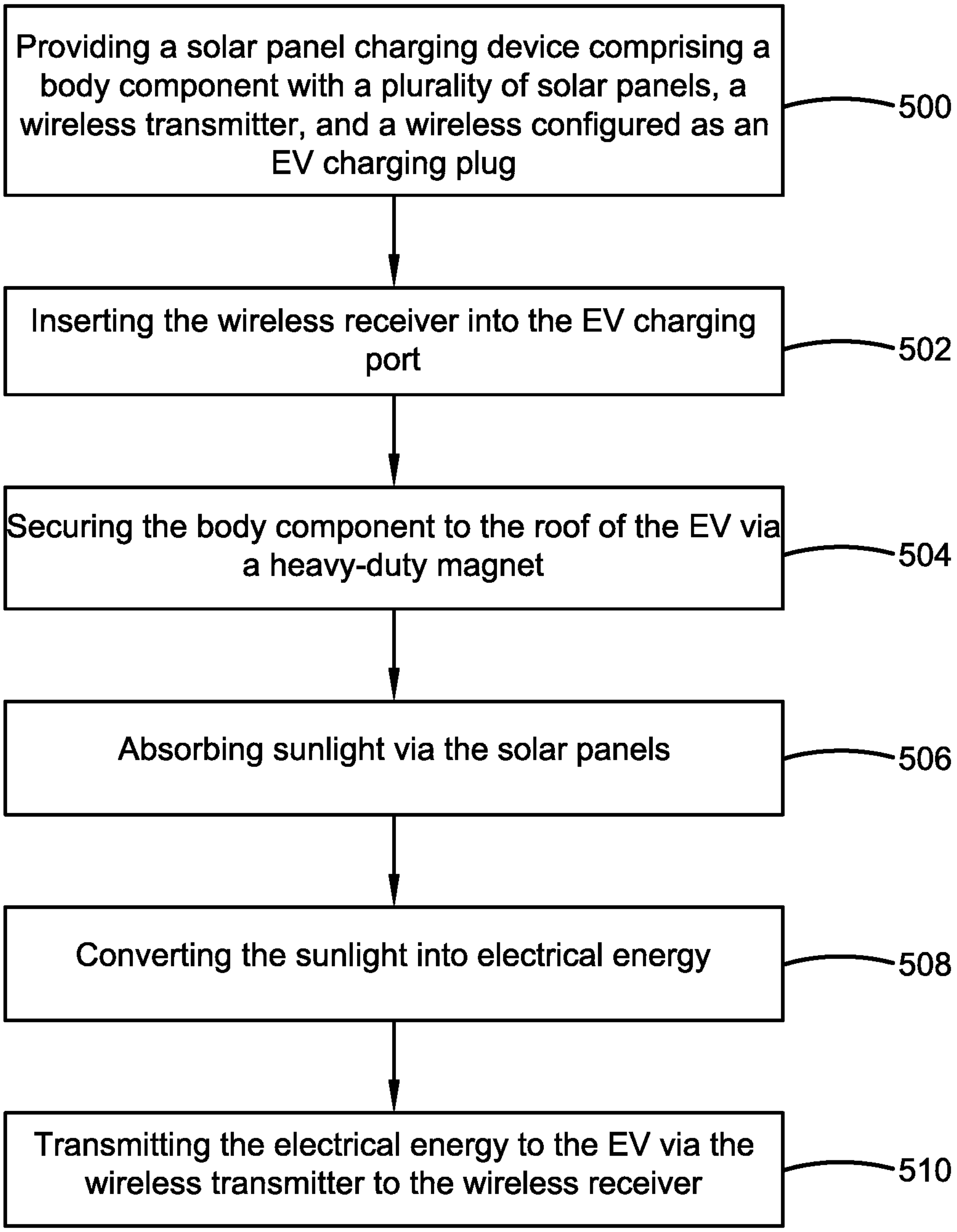
FIG. 5 illustrates a flowchart showing the method of charging an electric vehicle via solar panels in accordance with the disclosed architecture.

FIG. 5 illustrates a flowchart of the method of charging an electric vehicle via solar panels. The method includes the steps of at 500, providing an EV solar panel charging device comprising a body component with a plurality of solar panels, a wireless transmitter, and a wireless receiver configured as an EV charging plug. The method also comprises at 502, inserting the wireless receiver into the EV charging port. Further, the method comprises at 504, securing the body component to the roof of an EV via a heavy-duty magnet. The method also comprises at 506, absorbing sunlight via the solar panels. The method comprises at 508, converting the sunlight into electrical energy. Finally, the method comprises at 510, transmitting the electrical energy to the EV via the wireless transmitter to the wireless receiver.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "EV solar panel charging device", "charging device", "solar panel device", and "device" are interchangeable and refer to the solar panel charging device 100 of the present invention.

Notwithstanding the forgoing, the EV solar panel charging device 100 of the present invention can be of any suitable size and configuration as is known in the art without affecting the overall concept of the invention, provided that it accomplishes the above stated objectives. One of ordinary skill in the art will appreciate that the EV solar panel charging device 100 as shown in FIGS. 1-5 is for illustrative purposes only, and that many other sizes and shapes of the EV solar panel charging device 100 are well within the scope of the present disclosure. Although the dimensions of the EV solar panel charging device 100 are important design parameters for user convenience, the EV solar panel charging device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A solar panel charging device that provides a user with a portable electric vehicle charging solar unit, the solar panel charging device comprising:
- a body component;
- a plurality of solar panels;
- a wireless transmitter; and
- a wireless receiver;
- wherein the plurality of solar panels are secured to the body component;
- wherein the body component is secured to a roof of an electric vehicle;
- wherein the plurality of solar panels absorb solar energy and convert it to electrical energy;
- wherein the wireless transmitter collects the converted electrical energy from the plurality of solar panels; and
- further wherein the wireless transmitter transmits the collected electrical energy to the wireless receiver for charging the electric vehicle;
- wherein the wireless receiver is incorporated in an EV charging plug, such that the wireless receiver and the EV charging plug can be connected to an EV charging port for use.

2. The solar panel charging device of claim 1, wherein the body component is configured in a rectangular shape.

3. The solar panel charging device of claim 2, wherein the body component is approximately 5' wide×5' long; or approximately 3' wide×5' long.

4. The solar panel charging device of claim 3, wherein multiple body components can be secured together and positioned on the roof.

5. The solar panel charging device of claim 4, wherein the plurality of solar panels are hexagonal solar panels, and are positioned in series, to harness solar energy from sun.

6. The solar panel charging device of claim 5, wherein the plurality of solar panels comprise a 12 VDC-24 VDC converter/regulator and a charge level indicator.

7. The solar panel charging device of claim 6, wherein the wireless transmitter is secured to the body component and is in communication with the plurality of solar panels and the wireless receiver.

8. The solar panel charging device of claim 7, wherein the body component with the plurality of solar panels and the wireless transmitter are positioned on the roof of the electric vehicle and secured via a flexible, heavy-duty magnet.

9. The solar panel charging device of claim 8, wherein each of the plurality of solar panels includes at least one solar cell, a first substrate, a first encapsulant, a second substrate, and a second encapsulant.

10. The solar panel charging device of claim 9, wherein the second substrate, the solar cell, and the first substrate are sequentially stacked from below, and the first encapsulant covers the first substrate and the second encapsulant covers the second substrate to protect the solar cell.

11. The solar panel charging device of claim 10, wherein the body component comprises hinges or flexible connectors between the plurality of solar panels, to allow the body component to be folded and stored when not in use.

12. The solar panel charging device of claim 11 further comprising a plurality of indicia.

13. A solar panel charging device that provides a user with a portable electric vehicle charging solar unit, the solar panel charging device comprising:
- a body component configured in a rectangular shape;
- a plurality of hexagonal solar panels positioned in series, to harness solar energy from sun;
- a wireless transmitter secured to the body component and in communication with the plurality of hexagonal solar panels and a wireless receiver; and
- a wireless receiver incorporated in an EV charging plug, such that the wireless receiver and the EV charging plug can be connected to an EV charging port for use;
- wherein the plurality of hexagonal solar panels comprise a 12 VDC-24 VDC converter/regulator and a charge level indicator;
- wherein the plurality of hexagonal solar panels are secured to the body component;
- wherein the body component with the plurality of hexagonal solar panels and the wireless transmitter are positioned on a roof of an electric vehicle and secured via a flexible, heavy-duty magnet;
- wherein the body component comprises hinges or flexible connectors between the plurality of hexagonal solar panels, to allow the body component to be folded and stored when not in use;
- wherein the plurality of hexagonal solar panels absorb solar energy and convert it to electrical energy;
- wherein the wireless transmitter collects the converted electrical energy from the plurality of hexagonal solar panels; and further wherein the wireless transmitter transmits the collected electrical energy to the wireless receiver for charging the electric vehicle.

14. The solar panel charging device of claim 13, wherein the wireless receiver incorporated in the EV charging plug is adapted in size and shape for various makes and models of electric vehicles.

15. The solar panel charging device of claim 13, wherein the wireless receiver incorporated in the EV charging plug comprises an emergency release button for quickly removing the wireless receiver incorporated in the EV charging plug from the electric vehicle.

16. The solar panel charging device of claim 13, wherein the wireless receiver incorporated in the EV charging plug comprises a hand grip for easily and efficiently securing and removing the wireless receiver incorporated in the EV charging plug, as needed.

17. The solar panel charging device of claim 16, wherein the hand grip comprises textured areas for no-slip gripping.

18. The solar panel charging device of claim 13, wherein the electric vehicle can be charged with the solar panel charging device while the electric vehicle is moving or stationary.

19. A method of charging an electric vehicle via solar panels, the method comprising the following steps:

providing a solar panel charging device comprising a body component with a plurality of solar panels, a wireless transmitter, and a wireless receiver configured as an EV charging plug;

inserting the wireless receiver into the EV charging port;

securing the body component to the roof of an EV via a heavy-duty magnet;

absorbing sunlight via the solar panels;

converting the sunlight into electrical energy; and transmitting the electrical energy to the EV via the wireless transmitter to the wireless receiver.

* * * * *